May 6, 1952     A. KAUFMANN     2,595,464
BALANCED MOTION CONVERTING MECHANISM
Filed March 13, 1950
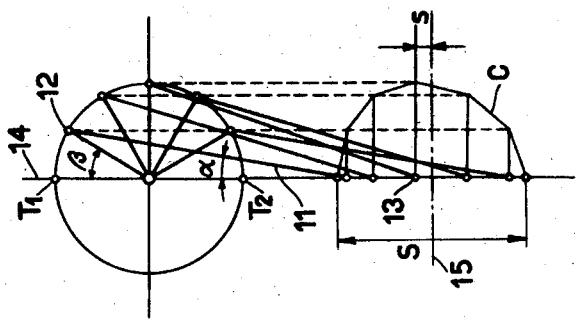
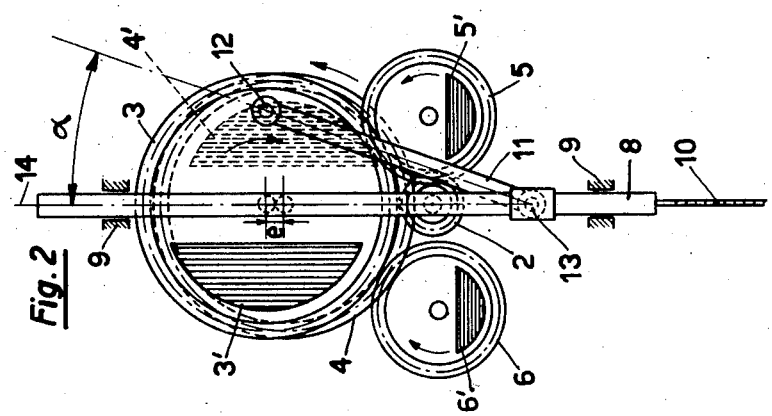
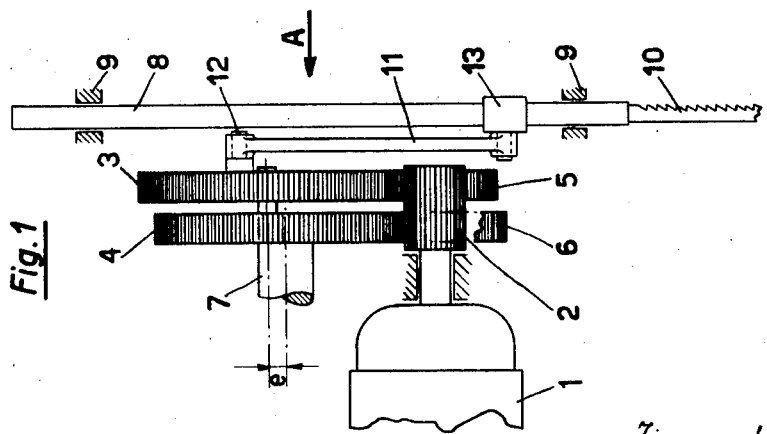
Inventor
Albert Kaufmann
by Karl Michaelis, atty.

Patented May 6, 1952

2,595,464

UNITED STATES PATENT OFFICE 2,595,464

BALANCED MOTION CONVERTING MECHANISM

Albert Kaufmann, Zuchwil, Switzerland, assignor to Scintilla Aktien-Gesellschaft, Solothurn, Switzerland, a joint-stock company of Switzerland Application March 13, 1950, Serial No. 149,389
In Switzerland March 29, 1949

8 Claims. (Cl. 74—44)

This invention relates to the conversion of rotary motion into reciprocatory motion.

It is an object of this invention to provide means for converting rotary motion into reciprocatory motion substantially free from any disturbing vibrations.

It is another object of this invention to convert high speed rotary motion of the order of thousands of revolutions per minute into high speed reciprocatory motion substantially free from primary and secondary vibrations set up by machine parts which are imparted simultaneously straight line reciprocatory and angular oscillatory motions, and to provide for a balancing of moving masses such as to practically suppress the vibrations set up by inertial forces directed in perpetually changing angular directions.

The invention will be described hereinafter by way of example as applied to a crank gearing inserted between, and serving to transmit power from, a rotary shaft to a connecting rod imparting to a tool, such as a light-weight saw, straight line reciprocatory motion of the order of about 3000 reciprocations per minute, but it should be understood that useful application of the invention is not limited to the presence of these particular devices.

As is well known to those skilled in the art, if high speed rotary motion is converted by means of a crank gear into high speed reciprocatory movement, vibrations are set up partly by inertial forces counteracting the high speed reversal of the angular displacements of the cranks.

In order to prevent this, counter-weights are used as a rule for balancing the moving masses of the crank mechanism and connecting rod, such counter-weights being arranged in diametrically opposite places, with reference to a crank shaft axis, relative to the crank pin. However, when crank gearing is used for converting high speed rotatory movement amounting for instance to 3000 rev./min. into reciprocatory movement, a single counter-weight will be insufficient for a satisfactory balancing of masses. For apart from the inertial forces of the crank mechanism and connecting rod, the complex straight-line and angular movement of the connecting rod gives rise to additional vibrations superposed to, and of a frequency double that of the vibrations set up by the reciprocatory parts. This double frequency has its origin in the following circumstance:

During the first quarter turn of the crank pin from a dead center position, owing to the gradually increasing inclination of the connecting rod relative to the middle axis extending through both dead center positions of the crank, the straight line movement of the cross-head suffers a retardation because a great part of the quarter circle travelled by the crank pin is being consumed in the angular oscillation of the respective end of the connecting rod, which encloses an angle with that middle axis, and is not converted into straight line movement. On the other hand, during the second quarter turn of the crank pin, following the first quarter turn, in the direction towards the second dead center position a similar combination of movements occurs, this time however in the opposite direction, the crank pin again approaching the middle axis and the angle included between this axis and the connecting rod becoming smaller. In consequence of this sequence of movements the straight line movement of the cross-head is now speeded up to the same extent it had been retarded before. This inequality of the straight line movement during each half turn of the crank generates a vibration, and during each full turn two additional vibrations, which thus constitute vibrations of double frequency, as compared to the vibrations of the parts moving in a straight line.

It is the main object of the present invention to balance these additional vibrations by generating a counter-acting frequency, and thereby to prevent disturbing concussions from arising.

I attain this end, according to this invention, by providing, in addition to the gearing serving for the transmission and conversion of the power from the rotary shaft to the reciprocatory mechanism, a second train of gears substantially equally dimensioned, and preferably arranged in parallel planes to, the power transmitting train of gears and also in direct operative connection with the rotary shaft, the power transmitting means, such as a pinion on the shaft, being in direct mesh not only with the smaller gear of the power transmitting train of gears, but also with the larger gear of the second (balancing) train of gears which is thus driven in a direction opposite to that of the power transmitting gearing.

All four gears carry balancing masses arranged in the manner described herebelow with reference to the drawing affixed to this specification and forming part thereof, which illustrates diagrammatically by way of example one embodiment of a power transmitting and converting mechanism according to my invention.

In the drawing,

Fig. 1 is a side elevation of the main parts constituting the new gear and part of a rotary motor driving same, while Fig. 2 is the corresponding front view, viewed in the direction of the arrow A in Fig. 1

Fig. 3 is a kinematic diagram illustrating the movements of the cranks and the connecting rod.

Referring to the drawing, 1 is part of the armature and shaft of an electromotor, and 2 is a pinion keyed on the shaft. The mechanism inserted between the pinion 2 and the reciprocatory member consists of the two trains of gears 3—5 and 4—6, respectively, the former being the power-transmitting train, the latter a balancing gearing which is also driven by the shaft. The number of teeth of the large gears 3 and 4 is double that of the number of teeth of the small gears 5 and 6. The pairs of gears are arranged in two parallel planes. The axial length of the motor pinion 2 is such that it meshes simultaneously with the small power transmitting gear 5 of the first train and also with the large gear 4 of the second train which does not participate in the transmission of power. Owing to this arrangement the two trains of gears rotate in opposite directions. The axis of rotation of one large gear is staggered relative to the axis of rotation of the other large gear by somewhat more than the height of one tooth, the (thin) axle pin 70 of the large gear 3 being mounted, in the embodiment shown, eccentrically on the end face of the (thicker) stationary axle 7, on which the large gear 4 is loosely mounted. The amount (e) of staggering of the two axles and gears corresponds to somewhat more than the height of one tooth. Owing to this arrangement only the teeth of gear 4 are in mesh with the pinion 2, while the teeth of gear 3 do not contact it. The gears of each train are dimensioned at the ratio of 1:2.

8 is a tool holder supported in guides 9 for axial reciprocation and 10 is a saw blade mounted on the holder. Obviously, instead of a saw blade, a file, a chisel or the like might be so mounted. 11 is a connecting rod connecting a crank pin 12 on the power transmitting gear 3 with a cross-head 13 on the tool holder.

A counter-weight 3' is mounted on the gear 3 eccentrically and in diametrical opposition to the crank pin 12, this counterweight being so chosen as to balance the mass moment of the crank pin, part of the mass of the connecting rod and part of the inertial forces generated by the movement of the tool and tool holder.

4' is a counter-weight mounted on the gear 4, which rotates in opposite direction, and this counter-weight balances the remainder of the inertial forces generated by the parts just described. The two counter-weights are so arranged relative to each other, that their centers of gravity during a revolution simultaneously reach from opposite sides both dead center positions of the crank. The detrimental vibrations of single frequency which might be generated in the mechanism, are thus suppressed.

However, as explained at the beginning, there arises during each stroke of the cross-head in both directions an additional oscillation of double frequency, generated by the retardations and accelerations of the connecting rod, and this double frequency vibration is superposed to the single frequency vibration, as can be guessed from the diagram of Fig. 3.

Here the connecting rod 11 encloses with the axis 14, extending through the two dead center positions T₁ and T₂ of the crank pin 12, an angle $a$, which during the first quarter turn of the crank from a dead center position increases and, at a crank angle $\beta$ equal to 90° reaches the maximum. In this position the crank pin has moved through one half of the arc corresponding to a stroke S, however, the cross-head 13 has not yet reached the middle axis 15 of the stroke S, there still remaining over the distance $s$. This is a consequence of the retardation brought about by the increase of the angle $a$ at the cross-head. If now the crank pin travels through this second quarter turn to reach the other dead center position, the angle $a$ will decrease until it becomes zero, when the connecting rod extends in parallel to the axis 14. In contrast to the first quarter turn, the cross-head is here accelerated, as can be guessed from the fact that during the first quarter turn of the crank pin the cross-head traveled through the distance $$\frac{S}{2} - s$$

while during the second quarter turn it traveled in an equal period of time through the distance $$\frac{S}{2} + s$$

Consequently the curve C of retardation and acceleration has an asymmetrical form relative to the middle axis 15.

In order now to suppress also these double-frequency vibrations, the small gears 5 and 6, which rotate at double the speed of the large gears, are also provided with eccentric counter-weights 5' and 6', and these counter-weights are so arranged relative to the counter-weights 3' and 4' of the large pair of gears that, when rotating, they reach their highest position, opposite to that shown in Fig. 2, at the moment where the crank is in either one of its two dead center positions. By suitably and accurately dimensioning these several counter-weight masses relative to each other, it becomes possible to attain a practically vibrationless movement of the entire mechanism.

Any small remainder of vibrations, which might still arise in any direction, might, if necessary, be eliminated by a third or fourth pair of gears and counter-weights. However, this remainder of vibrations is scarcely ascertainable and can be neglected with impunity.

I wish it to be understood that what I have shown and described hereabove, is only one embodiment of my invention, and that I do not desire to be limited to the details of construction, combination and arrangement shown and described, for obvious modifications will occur to a person skilled in the art.

I claim:

1. Means for converting in a power-driven hand tool high speed rotary motion into vibrationless high-frequency reciprocatory motion, comprising in combination, a driving shaft, a pinion on said shaft, a driven tool carrier guided for reciprocation, a power transmitting pair of gears meshing with said pinion on one side, a crank and a connecting rod operatively connecting said pair of gears with said driven tool carrier on the other side, another pair of gears of equal size as said first pair arranged in parallel to said first pair and also meshing with said pinion, said power transmitting pair of gears being operatively connected with said other pair for a drive of said other pair in a sense opposed to that of said first pair and a balancing mass on each gear of both pairs of gears.

2. Means for converting high speed rotary motion into vibrationless high-frequency reciprocatory motion, comprising in combination, a driving shaft, a pinion on said shaft, a driven member guided for reciprocation, a power transmitting train of two gears of unequal numbers of teeth operatively connected between said shaft and driven member, another train of gears of the same size and ratio as the gears in said first train operatively connected with said pinion for revolution in a sense opposite to that of said first train, a connecting rod eccentrically pivoted to the last member of said power transmitting train and linked to said driven member, and balancing masses on all gears of said two trains of gears.

3. The combination of claim 2, in which each of the two trains of gears consists of two gears with the numbers of their teeth related at the ratio of 1:2, the small gear of the power transmitting train and the large gear of the balancing train meshing with the pinion.

4. The combination of claim 2, in which the axes of the large gears of the two trains are staggered by substantially the height of one tooth.

5. The combination of claim 2, in which the axes of the large gears of the two gearings are staggered by substantially the height of one tooth and the pinion on the shaft is in mesh with the smaller gear of the power transmitting train and the larger gear of the other train.

6. The combination of claim 2, in which a crank pin is mounted on the second gear of the power transmitting train and the connecting rod is pivoted to said pin.

7. The combination of claim 2, in which a crank pin is mounted on the second gear of the power transmitting train, the axes of the larger gears of the two trains lying in a common plane extending through the crank pin axis in either of the dead centers of the crank pin, the balancing masses on said gears being so arranged that, when rotating, their centers of gravity simultaneously intersect said plane in one of two points, each spaced 180° from one of said dead centers of the crank pin axis.

8. The combination of claim 2, in which a crank pin is mounted on the second gear of the power transmitting train, the axes of the larger gears of the two trains lying in a common plane extending through the crank pin axis in either of the dead centers of the crank pin, the balancing masses on said gears being so arranged that, when rotating the centers of gravity of the balancing masses on said smaller gears simultaneously reach their highest positions when, after each half turn, said crank pin reaches one of its dead center positions.

ALBERT KAUFMANN.

REFERENCES CITED

The following references are of record in the file of this patent:

UNITED STATES PATENTS

| Number | Name | Date |
|---|---|---|
| 2,280,384 | Dickson | Apr. 21, 1942 |
| 2,428,924 | Albertson | Oct. 14, 1947 |